(12) United States Patent
Agarwal

(10) Patent No.: US 11,867,534 B2
(45) Date of Patent: Jan. 9, 2024

(54) DATA PROCESSING APPARATUS, SENSOR AND METHODS

(71) Applicant: Sony Group Corporation, Tokyo (JP)

(72) Inventor: Rajni Agarwal, Hampshire (GB)

(73) Assignee: Sony Group Corporation, Tokyo (JP)

( * ) Notice: Subject to any disclaimer, the term of this patent is extended or adjusted under 35 U.S.C. 154(b) by 177 days.

(21) Appl. No.: 17/430,402

(22) PCT Filed: Feb. 14, 2020

(86) PCT No.: PCT/GB2020/050356
§ 371 (c)(1),
(2) Date: Aug. 12, 2021

(87) PCT Pub. No.: WO2020/201680
PCT Pub. Date: Oct. 8, 2020

(65) Prior Publication Data
US 2022/0107192 A1    Apr. 7, 2022

(30) Foreign Application Priority Data
Mar. 29, 2019 (GB) ..................................... 1904422

(51) Int. Cl.
*G01D 21/00* (2006.01)
*H04W 84/02* (2009.01)
(Continued)

(52) U.S. Cl.
CPC ............ *G01D 21/00* (2013.01); *H04W 84/02* (2013.01)

(58) Field of Classification Search
CPC .......... G01D 21/00; G01D 1/02; G01D 18/00; G01D 21/02; H04W 4/38; H04W 4/70;
(Continued)

(56) References Cited

U.S. PATENT DOCUMENTS 6,041,738 A * 3/2000 Hemauer ............ A01K 63/042
119/226
6,662,099 B2  12/2003 Knaian et al.
(Continued)

FOREIGN PATENT DOCUMENTS

EP    2 911 130 A1    8/2015
EP    3 331 187 A1    6/2018

OTHER PUBLICATIONS

International Search Report and Written Opinion dated Apr. 23, 2020 in PCT/GB2020/050356 filed Feb. 14, 2020, 7 pages.
(Continued)

*Primary Examiner* — Jeffrey P Aiello
(74) *Attorney, Agent, or Firm* — Oblon, McClelland, Maier & Neustadt, L.L.P.

(57) ABSTRACT

A data processing method comprising: receiving, from each of a plurality of sensors each located at a respective location, a signal indicative of a respective value of a parameter measured by that sensor at a respective one of a plurality of successive times; and determining, based on the value of the parameter measured by one or more first sensors of the plurality of sensors at a respective one or more of the plurality of successive times, a value of the parameter at the location of a second sensor of the plurality of sensors at one of the one or more of the plurality of successive times.

18 Claims, 8 Drawing Sheets

(51) Int. Cl.
*G01C 21/34* (2006.01)
*G01C 21/36* (2006.01)

(58) Field of Classification Search
CPC ..... H04W 84/18; H04W 24/08; H04W 84/02; H04L 67/12; H04L 1/0002; G06N 20/00; G06N 5/046; G06N 3/02; G05B 23/0221; G05B 23/0283; G05B 19/4184; G06F 1/3234; Y02D 30/70; Y02D 10/00; G01C 21/3469; G01C 21/3691
USPC ......... 73/170.16; 340/531, 539.22, 584, 664, 340/870.17, 995.13; 367/127–129; 700/286; 702/60–62, 104, 116, 127–130, 702/183, 188–189; 706/12, 21
See application file for complete search history.

(56) References Cited

U.S. PATENT DOCUMENTS

| | | | |
|---|---|---|---|
| 9,843,947 B2 | 12/2017 | Loverich et al. | |
| 2004/0172210 A1* | 9/2004 | Rothfuss | G05B 23/0283 702/100 |
| 2008/0071465 A1* | 3/2008 | Chapman | G08G 1/0104 701/117 |
| 2008/0300803 A1 | 12/2008 | Drake et al. | |
| 2011/0051641 A1 | 3/2011 | Pan | |
| 2018/0139282 A1* | 5/2018 | DeLuca | H04L 67/12 |
| 2018/0176718 A1* | 6/2018 | VerSteeg | G01S 1/0423 |
| 2018/0210975 A1* | 7/2018 | Liu | G06N 20/00 |
| 2018/0270754 A1 | 9/2018 | Snyder et al. | |
| 2018/0375743 A1* | 12/2018 | Lee | G06F 17/16 |
| 2019/0280966 A1* | 9/2019 | Jagannath | H04L 45/122 |
| 2019/0386790 A1* | 12/2019 | Hawinkel | H04L 1/187 |

OTHER PUBLICATIONS

Benkahla, N., et al., "Enhanced Dynamic Duty Cycle in LoRaWAN Network", International Conference on Financial Cryptography and Data Security, XP047483840, 2018, pp. 147-162.

Kurasawa, H., et al., "Missing Sensor Value Estimation Method for Participatory Sensing Environment", IEEE International Conference on Prevasive Computing and Communications (PerCom), XP032594199, 2014, pp. 104-111.

Andersen, T., "Energy-Efficient Adaptive Sensing in low Power Wide Area Networks", Norwegian University of Science and Technology, 2016, 76 total pages.

* cited by examiner

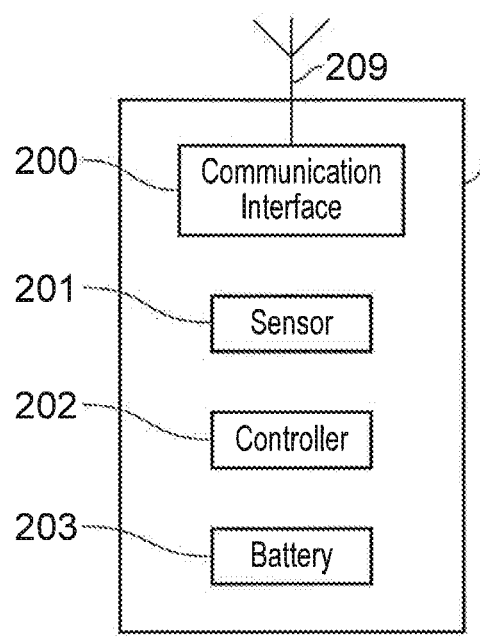
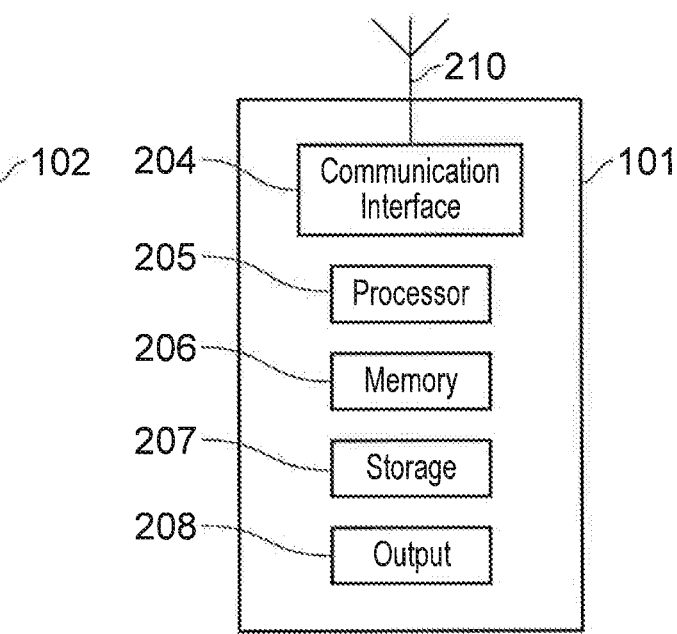
FIG. 2A
FIG. 2B

DATA PROCESSING APPARATUS, SENSOR AND METHODS

BACKGROUND

Field of the Disclosure

The present disclosure relates to a data processing apparatus, sensor and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Electronic sensors which are able to measure an environment parameter such as temperature, humidity, pressure and the like and output data indicative of the measured parameter have been known for some time. With improvements in device interconnectivity and processing power and reductions in sensor cost, however, it is now envisaged that data output by a large number of such sensors can be analysed in real time in order to monitor particular environments more effectively. There are many particular types of environment this type of data analysis could be applied to, such as road networks, pipelines, agricultural land and pedestrianized areas, to name a few examples.

In order to obtain useful environmental data from such sensors, it is necessary to distribute a relatively large number of sensors appropriately throughout the environment which is to be monitored. This is costly, both in terms of the cost of the sensors themselves and in securing each sensor at an appropriate position within the environment so as to allow it to make accurate measurements and to reduce the risk of it becoming dislodged. For example, if sensors are placed along a road in order to measure the temperature at the road surface, it may be necessary to bury, embed or encapsulate in for example a drainage feature each individual sensor in the road close to the road surface. This ensures that the road surface temperature can be accurately measured and reduces the risk of vehicles, pedestrians, animals or the like from dislodging the sensors. Once a set of sensors have been appropriately distributed over a particular environment, low maintenance of the sensors is therefore desirable. In particular, it is envisaged that each sensor may comprise a small battery in order to power it in making measurements and to power a transmitter provided with the sensor to wirelessly output data indicative of those measurements to a receiver. It is therefore desirable that this battery does not need to be changed very often (thereby limiting how often it is necessary to undertake the costly operation of finding each sensor, removing it from its position, replacing the battery and replace the sensor, for example).

SUMMARY

The present disclosure is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2A and 2B schematically show, respectively, the components of a sensor 102 and a data processing device 101, according to an embodiment;

DESCRIPTION OF THE EMBODIMENTS

Figure 1:
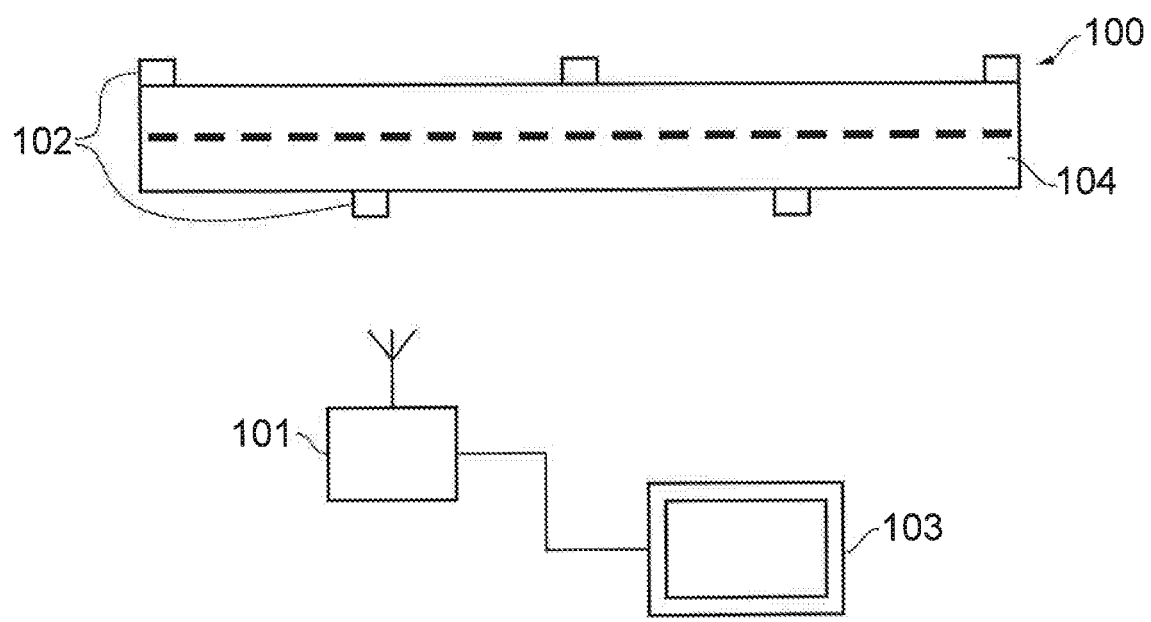
FIG. 1 schematically shows a system according to an embodiment.

Referring now to the drawings, wherein like reference numerals designate identical or corresponding parts throughout the several views.

FIG. 1 shows a system 100 according to an embodiment. The system comprises a plurality of sensors 102 and a data processing apparatus 101. Each of the sensors periodically measures the value of one or more environmental parameters and wirelessly transmits sensor data indicative of the measured parameter value(s) to the data processing device 101 for processing. The data processing device 101, in this example, is in data communication with a display device 103 (e.g. a smartphone or tablet computer with an electronic display) to which display data generated by the processing of the sensor data is sent for display on the display device. The data processing device 101 may take any suitable form, for example, an application server or central server. The data processing device 101 is not necessarily connected to a display device in the way as described in the embodiment of FIG. 1. The display device 103 is only an example and, more generally, the data processing device 101 is configured to output data to any suitable audio and/or visual device which, in turn, is configured to output information to a user based on that received data. The output information takes the form of measured or estimated parameter values at each of the sensor locations (as will be described) or information such as alerts determined based on such measured or estimated parameter values.

In this example, the sensors are distributed along a road 104 (e.g. partially or fully buried in the asphalt) and measure parameters of interest to an organisation (e.g. local authority) responsible for maintaining the road. The sensor data may be indicative of one or more of the temperature (e.g. to warn of the potential of ice (in particular, black ice) on the road when the temperature is within a predetermined threshold of 0° C.), humidity, an amount of a predetermined air pollutant (e.g. $NO_x$ or particulate pollutants), a vehicle count (e.g. determined according to a detectable change in noise, vibration and/or pressure as a vehicle passes a particular sensor, e.g. through a change of inductance in a coil), a presence and/or depth of standing water, snow or other settled precipitation (e.g. determined based on detecting the presence of moisture and/or an increase in pressure at the sensor location) and a presence of oil-based substance (e.g. in the case of an oil or diesel spillage), for example. Regular measurement of parameters such as these along the road is useful in helping the local authority manage traffic, plan road repairs, advertise travel conditions and the like. It will be appreciated that the system 100 could be implemented in a different environment (e.g. with sensors distributed along a pipeline, across agricultural land or across pedestrianized areas, for example) and that the sensor data will then indicate measurements of parameters relevant to that different environment. However, for the sake of demonstration of the present technique, a road environment is described here. The disclosure is not limited to arranging the sensors in a 1 dimensional array.

FIGS. 2A and 2B respectively show the components of a sensor 102 and the data processing device 101, according to an embodiment. Each sensor in FIG. 1 has the components shown in FIG. 2A.

The sensor 102 comprises a communication interface 200 for wirelessly transmitting signals to (and, optionally, wirelessly receiving signals from) the data processing device 101 via antenna 209, sensor hardware 201 for measuring one or more parameters of the environment, a controller 202 and a battery 203 for powering each of the other components. The controller 202 controls the operation of each of the communication interface 200, sensor hardware 201 and battery 203. Each of the components of the sensor is implemented, where necessary, using appropriate circuitry, for example.

The data processing device 101 comprises a communication interface 204 for wirelessly receiving signals from (and, optionally, wirelessly transmitting signals to) each of the sensors 102 via antenna 210, a processor 205 for processing electronic instructions, memory 206 for storing the electronic instructions to be processed and input and output data associated with the electronic instructions, a storage medium 207 (e.g. in the form of a hard disk drive, solid state drive, tape drive or the like) for long term storage of electronic information and a display interface 208 for outputting the display data to the display device 103 (or other audio and/or visual device). The processor 205 controls the operation of each of the communication interface 204, memory 206, storage medium 207 and display output 208. Each of the components of the data processing device is implemented, where necessary, using appropriate circuitry, for example. Signals received from the sensors comprise the sensor data.

In an embodiment, the signals transmitted between the sensor 102 and the data processing device 101 are radio signals. More particularly, they may be radio signals transmitted over a low-power wide-area network (LPWAN) such as ELTRES® by Sony®, or LoRa®, or Sigfox®, that are designed to operate in frequency bands in a duty-cycle constrained manner as mandated by regional regulators such as ETSI (European Telecommunications Standards Institute) in Europe. In an embodiment, each sensor has a periodic active time period (in which the sensor is able to send and/or receive data) and a periodic inactive time period (in which the sensor is not able to send and/or receive data). The periodic switching between the active state and the inactive state of the sensor is controlled by the controller 202. Sensor data is periodically transmitted to the device 101 by each sensor 102 during a subset of the periodic active time periods of that sensor. In the case that the sensor data is transmitted over an LPWAN, the length of the periodic active time period during which the sensor data can be transmitted is constrained according to the LPWAN duty-cycle constraint. In embodiments, the LPWAN may be implemented as part of a licenced or unlicensed/license-exempt system.

Power is required to be supplied from the battery 203 each time a sensor 102 makes a measurement and transmits corresponding sensor data to the data processing device 101. Thus, the more often each sensor is required to make a measurement and transmit sensor data, the faster the battery will be depleted and the more often the battery will need to be changed or charged. Regularly changing the battery of each of a relatively large number of sensors distributed over an environment is a costly process. Even if the battery is rechargeable (e.g. using an energy harvesting technique such as capturing solar energy using a solar panel (not shown) comprised within the sensor), there is still a desire to reduce the use of battery power to alleviate the risk of the battery becoming depleted between charges (e.g. during winter when there is little sunlight to reach a sensor's solar panel).

In order to reduce the battery depletion rate of each sensor 102, in an embodiment, the sensors are divided into groups, each group comprising a plurality of sensors and being associated with a respective one of the sensors (this is referred to as the group sensor). For each group, each sensor in the group then takes a measurement and transmits corresponding sensor data to the data processing device 101 at a respective one of a plurality of successive times. Once each sensor in the group has taken a measurement and transmitted its sensor data, the process is then repeated. Based on the value of the parameter measured by each sensor of the group at its respective time, the data processing apparatus 101 then determines an estimated value of the parameter at the location of the group sensor at each of the successive times. This allows a value of the parameter (as actually measured or as estimated) to be determined at the location of the group sensor at each of the successive times, even though the group sensor itself only actually makes a measurement and transmits sensor data at one of those times. Each sensor is the group sensor of one group and may also be a sensor in one or more other groups associated with respective other sensors (the other sensors being the group sensors of these respective other groups). This means that a value of the parameter is determined for each sensor each time that a measurement is taken, even though that sensor only takes a measurement at a portion of those times.

This arrangement allows the parameter to be monitored over the entire environment over which the sensors are distributed whilst reducing the number of times each individual sensor must make a measurement and transmit sensor data, thereby reducing the battery depletion rate of each individual sensor and reducing how often sensor batteries must be replaced. The reduction in sensor data transmitted (since only one sensor in each group need transmit sensor data at each successive time rather than all sensors) also increases network capacity and reduces the relative cost of network ownership.

This is demonstrated in FIGS. 3A to 3E, which show the road 104 and sensors of FIG. 1 at a plurality of successive times $t_1$ to $t_5$. The sensors are individually labelled $S_{n-2}$, $S_{n-1}$, $S_n$, $S_{n+1}$ and $S_{n+2}$ and form a group of sensors in which $S_n$ is the group sensor. At time $t_1$ (FIG. 3A), a first sensor in the group $S_n$ (which, in this case, is the group sensor) takes a measurement of a parameter and transmits sensor data indicative of the measured parameter value to the data processing device 101. Let us assume that the parameter in this example is temperature. It will be appreciated that another parameter could be measured, however. At time $t_2$ (FIG. 3B), a second sensor in the group $S_{n+1}$ takes a temperature measurement and transmits sensor data indicative of the measured temperature value to the data processing device 101. At time $t_3$ (FIG. 3C), a third sensor in the group $S_{n+2}$ takes a temperature measurement and transmits sensor data indicative of the measured temperature value to the data processing device 101. At time $t_4$ (FIG. 3D), a fourth sensor in the group $S_{n-2}$ takes a temperature measurement and transmits sensor data indicative of the measured temperature value to the data processing device 101. Finally, at time $t_5$ (FIG. 3E), a fifth sensor in the group $S_{n-1}$ takes a temperature measurement and transmits sensor data indicative of the measured temperature value to the data processing device 101. All sensors in the group have therefore provided a temperature measurement to the data processing device.

The process of each sensor in the group successively making one measurement and transmitting corresponding sensor data until all sensors in the group have done so may be referred to as a measurement cycle. In this example, the measurement of the temperature by the sensor $S_n$ is the first measurement of the measurement cycle and the measurement of the temperature by the sensor $S_{n-1}$ is the final measurement of the measurement cycle. The measurement cycle is continuously repeated so that, after measurement by $S_{n-1}$ at $t_5$ in one measurement cycle, the next measurement is taken by $S_n$ at $t_1$ in the next measurement cycle. Each measurement cycle thus has a respective $t_1$, $t_2$, $t_3$, $t_4$ and $t_5$ value. For example, if measurements are taken every 10 minutes with the first measurement cycle beginning at time 00:00, then, for the first measurement cycle, $t_1$=00:00, $t_2$=00:10, $t_3$=00:20, $t_4$=00:30 and $t_5$=00:40. For the second measurement cycle, $t_1$=00:50, $t_2$=01:00, $t_3$=01:10, $t_4$=01:20 and $t_5$=01:30. For the third measurement cycle, $t_1$=01:40, $t_2$=01:50, $t_3$=02:00, $t_4$=02:10 and $t_5$=02:20, and so on.

The processor 205 of the data processing device 101 then determines, for each successive time at which a measurement is made during each measurement cycle, a temperature value for the group sensor. In an embodiment, this is done by determining a weighted sum of the latest measured temperature of each sensor in the group. The weighting associated with each sensor is determined according to any suitable factor(s), such as the amount of time elapsed since that sensor last took a measurement and the location of that sensor (e.g. the spatial separation of that sensor from the group sensor). The weighted sum providing the calculated temperature $TC_n$ of the group sensor $S_n$ is:

$$TC_n = W_{n-2}T_{n-2} + W_{n-1}T_{n-1} + W_nT_n + W_{n+1}T_{n-2} + W_{n+2}T_{n+2}$$

Here, $W_i$ is the weighting associated with sensor $S_i$ and $T_i$ is the latest measured temperature of the sensor $S_i$. The measured temperatures used to calculated $TC_n$ after each measurement taken during the measurement cycle and the extent to which they influence the value of $TC_n$, are reflected in the weightings $W_n$, $W_{n+1}$, $W_{n+2}$, $W_{n-1}$ and $W_{n-2}$. The weightings are appropriately adjusted each time a new measurement is taken during the measurement cycle. An example set of weightings is shown in Table 1:

TABLE 1

| Measurement Time | $W_{n-2}$ | $W_{n-1}$ | $W_n$ | $W_{n+1}$ | $W_{n+2}$ |
|---|---|---|---|---|---|
| t1 | 0 | 0 | 1 | 0 | 0 |
| t2 | 0 | 0 | 0.5 | 0.5 | 0 |
| t3 | 0 | 0 | 0.4 | 0.3 | 0.3 |
| t4 | 0.3 | 0 | 0.3 | 0.2 | 0.2 |
| t5 | 0.2 | 0.2 | 0.2 | 0.2 | 0.2 |

According to Table 1, for each measurement cycle, when $S_n$ makes the first measurement $T_n$ at $t_1$, the measured temperature used to calculate $TC_n$ is $T_n$ only (since this is the actual temperature measured by $S_n$). Thus, $W_n$=1 and $W_{n+1}$, $W_{n+2}$, $W_{n-2}$ and $W_{n-1}$=0. When $S_{n+1}$ makes the next measurement $T_{n+1}$ at $t_2$, the measured temperatures used to calculate $TC_n$ are $T_n$ (as previously measured at $t_1$) and $T_{n+1}$ with weightings $W_n$=0.5 and $W_{n+1}$=0.5, respectively. Here, $W_{n+2}$, $W_{n-2}$ and $W_{n-1}$=0. When $S_{n+2}$ makes the next measurement $T_{n+2}$ at $t_3$, the measured temperatures used to calculate $TC_n$ are $T_n$ (as previously measured at $t_1$), $T_{n+1}$ (as previously measured at $t_2$) and $T_{n+2}$ with weightings $W_n$=0.4, $W_{n+1}$=0.3 and $W_{n+2}$=0.3, respectively. Here, $W_{n-2}$ and $W_{n-1}$=0. When $S_{n-2}$ makes the next measurement $T_{n-2}$ at $t_4$, the measured temperatures used to calculate $TC_n$ are $T_n$ (as previously measured at $t_1$), $T_{n+1}$ (as previously measured at $t_2$), $T_{n+2}$ (as previously measured at $t_3$) and $T_{n-2}$ with weightings $W_n$=0.3, $W_{n+1}$=0.2, $W_{n+2}$=0.2 and $W_{n-2}$=0.3, respectively. Here, $W_{n-1}$=0. Finally, when $S_{n-1}$ makes the next measurement $T_{n-1}$ at $t_5$, the measured temperatures used to calculate $TC_n$ are $T_n$ (as previously measured at $t_1$), $T_{n+1}$ (as previously measured at $t_2$), $T_{n+2}$ (as previously measured at $t_3$), $T_{n-2}$ (as previously measured at $t_4$) and $T_{n-1}$ with weightings $W_n$=0.2, $W_{n+1}$=0.2, $W_{n+2}$=0.2 and $W_{n-2}$=0.2 and $W_{n-1}$=0.2.

It is noted that the weightings in Table 1 at each of the times $t_1$, $t_2$, $t_3$, $t_4$ and $t_5$ also take into account the location of each sensor so that, for example, a sensor closer to the group sensor $S_n$ will have a higher weighting than a sensor further from the group sensor $S_n$. For example, at time $t_2$ in Table 1, $S_{n+1}$ is the sensor which takes the temperature measurement (the temperature measurement, $T_{n+1}$, being the most recent temperature measurement in the measurement cycle and thus, temporally, the most relevant) and is allocated a weighting of $W_{n+1}$=0.5. On the other hand, at time $t_3$ in Table 1, although $S_{n+2}$ is the sensor which takes the temperature measurement (the temperature measurement, $T_{n+2}$, being the most recent temperature measurement in the measurement cycle and thus, temporally, the most relevant) it is allocated a weighting of only $W_{n+2}$=0.3. This is because $S_{n+2}$ is located further away from the group sensor $S_n$ than $S_{n+1}$ (and therefore the temperature at $S_{n+2}$ is considered to have less relevance to the temperature at $S_n$ than the temperature at $S_{n+1}$). It will thus be appreciated that, in an embodiment, the weightings of each sensor at each measurement time of the measurement cycle take into account both the time elapsed since that sensor last made a measurement and the location of that sensor. It will be appreciated that the weightings in Table 1 (and Tables 2 to 4, described later) are only examples and that, in practice, the weightings will be determined according to the specific characteristics of the environment in which the measurements are made and the parameter(s) which are measured.

Each sensor will have its own respective group of sensors with a corresponding set of measurement times (at each of which at least one sensor in the group will take a measurement) and weightings (defined for each sensor in the group for each of the measurement times). In an embodiment, each group comprises the group sensor plus one or more sensors located in the vicinity of the group sensor.

For example, for sensors arranged along a pathway such as a road, each group may comprise the group sensor plus a predetermined number of sensors either side of the group sensor. In the example of FIGS. 3A to 3E, each group comprises two sensors on each side of the group sensor. It will be appreciated that, in reality, the road 104 of FIGS. 3A to 3E extends further than shown and comprises a larger number of sensors. Thus, the sensor $S_{n-1}$ will have a group comprising the sensors $S_{n-3}$ (not shown), $S_{n-2}$, $S_{n-1}$, $S_n$ and $S_{n+1}$, sensor $S_{n+1}$ will have a group comprising the sensors $S_{n-1}$, $S_n$, $S_{n+1}$, $S_{n+2}$ and $S_{n+3}$ (not shown), and so on (it will thus be seen that each sensor is both a group sensor and is a sensor within the respective groups of one or more other sensors). Each measurement taken by each sensor is used for each of the groups to which that sensor belongs (with an appropriate weighting for each measurement time for each group). For example, assume that the weightings of the groups of sensors for $S_{n-1}$, $S_n$ and $S_{n+1}$ are given by Tables 2, 3 and 4, respectively.

TABLE 2

| Measurement Time (group $S_{n-1}$) | $W_{n-3}$ | $W_{n-2}$ | $W_{n-1}$ | $W_n$ | $W_{n+1}$ |
|---|---|---|---|---|---|
| t1 | 0 | 0 | 1 | 0 | 0 |
| t2 | 0 | 0 | 0.5 | 0.5 | 0 |
| t3 | 0 | 0 | 0.4 | 0.3 | 0.3 |
| t4 | 0.3 | 0 | 0.3 | 0.2 | 0.2 |
| t5 | 0.2 | 0.2 | 0.2 | 0.2 | 0.2 |

TABLE 3

| Measurement Time (group $S_n$) | $W_{n-2}$ | $W_{n-1}$ | $W_n$ | $W_{n+1}$ | $W_{n+2}$ |
|---|---|---|---|---|---|
| t1 | 0 | 0 | 1 | 0 | 0 |
| t2 | 0 | 0 | 0.5 | 0.5 | 0 |
| t3 | 0 | 0 | 0.4 | 0.3 | 0.3 |
| t4 | 0.3 | 0 | 0.3 | 0.2 | 0.2 |
| t5 | 0.2 | 0.2 | 0.2 | 0.2 | 0.2 |

TABLE 4

| Measurement Time (group $S_{n+1}$) | $W_{n-1}$ | $W_n$ | $W_{n+1}$ | $W_{n+2}$ | $W_{n+3}$ |
|---|---|---|---|---|---|
| t1 | 0 | 0 | 1 | 0 | 0 |
| t2 | 0 | 0 | 0.5 | 0.5 | 0 |
| t3 | 0 | 0 | 0.4 | 0.3 | 0.3 |
| t4 | 0.3 | 0 | 0.3 | 0.2 | 0.2 |
| t5 | 0.2 | 0.2 | 0.2 | 0.2 | 0.2 |

Note that the times $t_1$, $t_2$, $t_3$, $t_4$ and $t_5$ of each group are the measurement times of the measurement cycle of that group and are defined individually for each group (that is, $t_j$ of group $S_n$ is not necessarily the same as time $t_j$ of group $S_{n-1}$ or $S_{n+1}$). Considering the sensors $S_{n-2}$, $S_{n-1}$, $S_n$, $S_{n+1}$ and $S_{n+2}$, in this example, the time at which sensor $S_n$ makes a single measurement is defined as $t_2$ in group $S_{n-1}$ (with weighting $W_n=0.5$), $t_1$ in group $S_n$ (with weighting $W_n=1$) and $t_5$ in group $S_{n+1}$ (with weighting $W_n=0.2$). The time at which sensor $S_{n+1}$ makes a single measurement is defined as $t_3$ in group $S_{n-1}$ (with weighting $W_{n+1}=0.3$), $t_2$ in group $S_n$ (with weighting $W_{n+1}=0.5$) and $t_1$ in group $S_{n+1}$ (with weighting $W_{n+1}=1$). The time at which sensor $S_{n+2}$ makes a single measurement is not defined in group $S_{n-1}$ (since sensor $S_{n+2}$ is not part of the group of sensor $S_{n-1}$), but is defined as $t_3$ in group $S_n$ (with weighting $W_{n+2}=0.3$) and $t_2$ in group $S_{n+1}$ (with weighting $W_{n+2}=0.5$). In this example, when sensor $S_{n+2}$ makes a measurement, sensor $S_{n-3}$ also makes a measurement (and does so at $t_4$ in group $S_{n-1}$ with weighting $W_{n-3}=0.3$). The time at which sensor $S_{n-2}$ makes a single measurement is defined as $t_5$ in group $S_{n-1}$ (with weighting $W_{n-2}=0.2$) and $t_4$ in group $S_n$ (with a weighting $W_{n-2}=0.3$), but is not defined for group $S_{n+1}$ (since sensor $S_{n-2}$ is not part of the group of sensor $S_{n+1}$). In this example, when sensor $S_{n-2}$ makes a measurement, sensor $S_{n+3}$ also makes a measurement (and does so at $t_3$ in group $S_{n+1}$ with weighting $W_{n+3}=0.3$). The time at which sensor $S_{n-1}$ makes a single measurement is defined as $t_1$ in group $S_{n-1}$ (with weighting $W_{n-1}=1$), $t_5$ in group $S_n$ (with weighting $W_{n-1}=0.2$) and $t_4$ in group $S_{n+1}$ (with weighting $W_{n-1}=0.3$). It is thus demonstrated how a single measurement taken by each sensor is simultaneously used by each different group to which that sensor belongs, thus facilitating efficient use of sensor data.

Figure 3A:
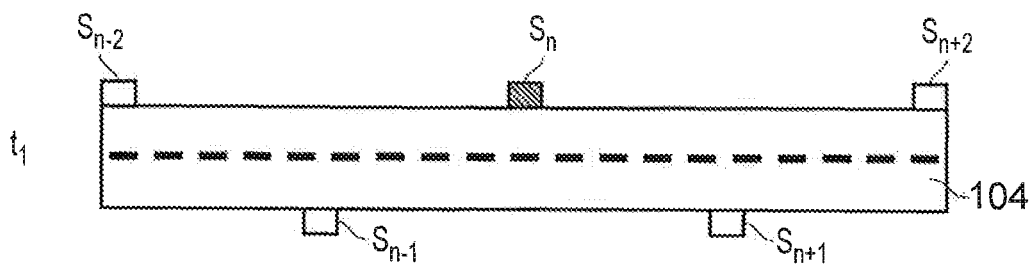
FIGS. 3A to 3E schematically show the system of FIG. 1 at a plurality of successive times.
Figure 3B:
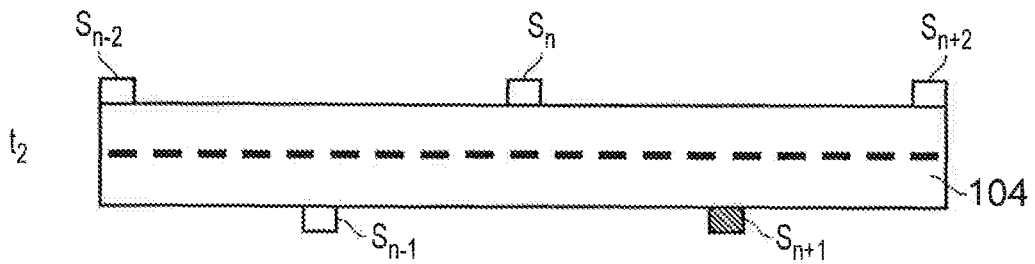
Figure 3C:
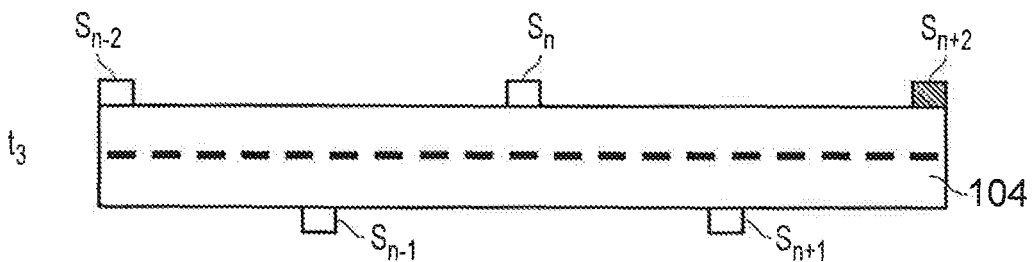
Figure 3D:
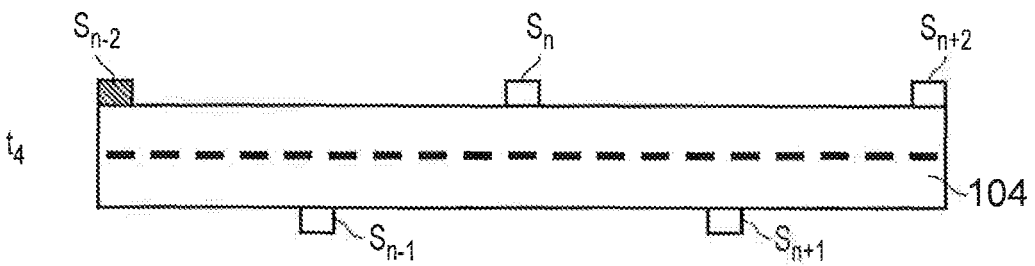
Figure 3E:
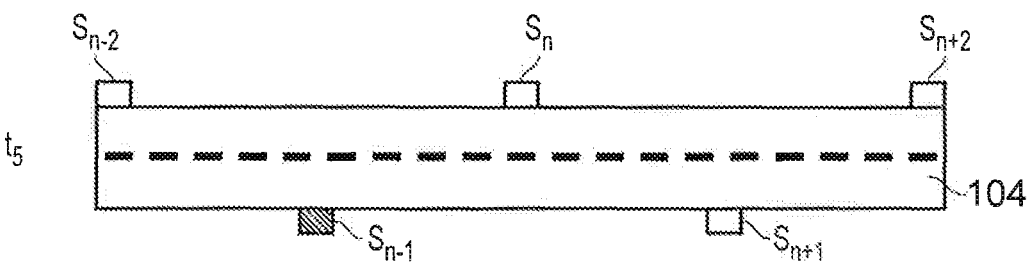

The groups of group sensors located in the vicinity of the limits of the sensor distribution (e.g. at the ends of the road 104 past which there are no more sensors) may have a reduced number of sensors. For example, if sensor $S_{n-2}$ in FIGS. 3A to 3E is at the end of the road 104, then there are no other sensors towards its left hand side. The group of sensor $S_{n-2}$ may therefore comprise only sensors $S_{n-2}$, $S_{n-1}$ and $S_n$. In this case, it will be appreciated that only temperatures $T_{n-2}$, $T_{n-1}$ and $T_n$ will be measured during the measurement cycle for the $S_{n-2}$ group and that there will be two missing measurements compared to groups of sensors (e.g. the group of $S_n$) located away from the end of the road. In this case, weightings are still defined for the same number of measurement times (i.e. for $t_1$, $t_2$, $t_3$, $t_4$ and $t_5$ of the $S_{n-2}$ group). However, the weightings will only be defined for $T_{n-1}$, $T_{n-1}$ and $T_n$. Alternatively, the number of group sensors may be constant, and the groups of group sensors located in the vicinity of the limits of the sensor distribution may comprise additional sensors in order to make up the required total number. For example, if sensor $S_{n-2}$ in FIGS. 3A to 3B is at the end of the road 104, then the group of sensor $S_{n-2}$ may comprise sensors $S_{n+1}$ and $S_{n+2}$ as well as $S_{n-2}$, $S_{n-1}$ and $S_n$ in order to ensure a total of five sensors in the group. Alternatively, one or more of the sensors in groups of sensors located in the vicinity of the limits of the sensor distribution may be configured to make measurements more often in order to provide improved accuracy. For example, if the group of sensor $S_{n-2}$ at the end of the road comprises only sensors $S_{n-2}$, $S_{n-1}$ and $S_n$, then one or more of these sensors may be configured to take one or more additional measurements in order to ensure that one measurement is taken per time $t_1$, $t_2$, $t_3$, $t_4$ and $t_5$ of the group. This improves the accuracy of the calculated temperature at the location of $S_{n-2}$ whilst only requiring a small proportion of the sensors (i.e. a portion of those located in the group of $S_{n-2}$ rather than all sensors) to make more frequent measurements. Thus, even if these sensors require a battery replacement more frequently, this is not the case for most of the other sensors.

It will be appreciated that the sensors in each group may be determined according to one or more other parameters. For example, each group may comprise all sensors within a predetermined distance of the group sensor. The weightings and any additional measurements of sensors in the group are then adjusted depending on the number of sensors in each group.

Sensor variables such as the number of sensors in each group, the relative spatial separation of the sensors in each group, the interval between the successive times at which each sensor in the group takes a measurement and transmits sensor data and the weightings allocated to each sensor at each of those successive times are determined in advance depending on the nature of the one or more parameters which are measured by each sensor. For example, if a measured parameter is known to have greater spatial variation, then the relative spatial separation of the sensors in each group is less and/or the rate at which the sensor weighting is reduced with distance from the group sensor is greater. Conversely, if the measured parameter is known to have less spatial variation, then the relative spatial separation of the sensors in each group is greater and/or the rate at which the sensor weighting is reduced with distance from the group sensor is less. In another example, if a measured parameter is known to have greater temporal variation, then the number of sensors in each group is less, the interval between the successive times at which each sensor in the group takes a measurement and transmits sensor data is less and/or the rate at which the weighting of each sensor is reduced with time since the last measurement of that sensor was taken is greater. Conversely, if the measured parameter is known to have less temporal variation, then the number of sensors in each group is greater, the interval between the successive times at which each sensor in the group takes a measurement and transmits sensor data is greater and/or the rate at which the weighting of each sensor is reduced with time since the last measurement of that sensor was taken is less. This allows an appropriate balance between the accuracy of estimated parameter values and the reduction in sensor battery depletion rate. It will be appreciated that, depending on the one or more parameters measured, each of the sensor variables may be chosen accordingly based on experimental or computer modelled data, for example.

In an embodiment, one or more of the sensor variables may be adjusted according to different times at which the amount of spatial and/or temporal variation of one or more of the measured parameters is different. For example, if the measured parameter is temperature, then it may be the case that, during the night (e.g. between the hours of 10 pm and 4 am when there is no sunlight), the temporal and/or spatial variation of temperature is lower than during the day (e.g. between the hours of 4 am and 10 pm when there are varying amounts of sunlight cast from different angles). One or more of the sensor variables may therefore be adjusted to reflect this.

In a first example, the number of sensors in each group is reduced during the night and increased during the day. This correspondingly increases and decreases the relative spatial separation of the sensors in each group during the night and day, respectively. This allows the number of measurements made by a portion of the sensors in the group to be reduced, thereby further reducing the power consumption of these sensors. For example, during the day, the group of sensor $S_n$ in FIGS. 3A to 3E may comprises the five sensors $S_{n-2}$, $S_{n-1}$, $S_n$, $S_{n+1}$ and $S_{n+2}$ whereas, during the night, the group of sensor $S_n$ may comprise only three sensors $S_{n-2}$, $S_n$ and $S_{n+2}$ (i.e. sensors $S_{n-1}$ and $S_{n+1}$ do not perform any measurements during the night). This means that measurements are made at times $t_1$, $t_3$ and $t_4$ only. The weightings of the sensors $S_{n-2}$, $S_n$ and $S_{n+2}$ at each of the times $t_1$, $t_3$ and $t_4$ are adjusted accordingly (so as to ensure that the sum of the weightings is 1). In an embodiment, weightings may continue to be calculated for times $t_2$ and $t_5$ so as to determine values of $TC_n$ at these times (even though no new measurements are taken at these times), thereby allowing an updated value of $TC_n$ to be provided at each time of the measurement cycle ($t_1$, $t_2$, $t_3$, $t_4$ and $t_5$).

In an embodiment, the sensors included in the reduced number of sensors during the night is varied so as to achieve more uniform battery depletion. For example, for each night, a different three of the five sensors in each sensor group may be selected (and allocated appropriate weightings) so that, over time, the battery depletion rate of the sensors is approximately uniform. On average, each sensor will only be operational during 3 out of 5 nights, thereby reducing the sensor power consumption of all sensors. In an example, each sensor in each group is configured with a predefined schedule to determine whether or not it is to take measurements on a given night. In this case, the controller 202 of each sensor comprises a storage medium to store information indicative of the predefined schedule and timing circuitry (e.g. implementing a clock and calendar) to determine (according to the schedule) whether the sensor is to transmit or not at any given time. During the night, the device 101 then determines which of the sensors are taking measurements (and which should thus be included in the sensor group for the night) based on the sensor data it receives (it will receive sensor data only from sensors which are taking measurements). In another example (e.g. in which the sensors can receive data from as well as transmit data to the device 101), the device 101 may transmit a scheduling signal to the sensors in each group each night indicating which sensors of the group are to take measurements that night. The scheduling signal may include, for example, information indicative of a list of the unique sensor identifiers of the sensors which are to perform measurements that night. Each sensor then performs measurements and transmits sensor data during the night only if its unique sensor identifier is included in the list. In an embodiment, information indicative of sets of weightings for each possible subset of sensors of each group is stored in the storage medium 207. One of the sets of weightings is then selected based on the subset of sensors selected to take measurements during a particular night.

In a second example (which may be combined with the first example), the times at which measurements are made are less frequent during the night and more frequent during the day. For example during the day, each consecutive measurement time $t_1$, $t_2$, $t_3$, $t_4$ and $t_5$ may be separated by a time interval of 10 minutes whereas, during the night, the separation interval may increase to 20 minutes. This halves the number of measurements which must be made during the night, thereby reducing sensor power consumption. This may be accompanied by adjustments to the sensor weightings for each measurement time, if appropriate. In this example, the device 101 may transmit a scheduling signal indicating a new time interval between which consecutive measurements should be made. Each sensor then adjusts how often it takes a measurement and transmits sensor data to the device 101. For example, if the time interval is doubled (e.g. from 10 minutes to 20 minutes), then each sensor should make a measurement and transmit sensor data half as often, if the time interval is tripled (e.g. from 10 minutes to 30 minutes), then each sensor should make and transmit sensor data a third as often, and so on. Alternatively (e.g. in the case that each sensor can only receive but not transmit signals), each sensor may be preconfigured to change how often it takes a measurement and transmits sensor data based on whether it is the day or night. In this case, the controller 202 of each sensor comprises a storage medium to store information indicative of how often to undertake measurement and transmission at a given time (e.g. at a certain periodicity during the day and at half the periodicity at night) and timing circuitry (e.g. implementing a clock) to determine whether it is day or night.

In a third example (which may be combined with the first and/or second examples), the weightings may be adjusted according to whether it is day or whether it is night. During the day (when the spatial and/or temporal variation in temperature is greater), the rate at which the sensor weighting is reduced with distance from the group sensor and/or with time since the last measurement was taken is greater. During the night (when the spatial and/or temporal variation in temperature is less), the rate at which the sensor weighting is reduced with distance from the group sensor and/or with time since the last measurement was taken is less.

In an embodiment, each of the sensors 102 is associated with a unique identifier which is included with the sensor data each time sensor data is transmitted to the data processing device 101. This allows the device 101 to associate each instance of received sensor data with a particular sensor. Information indicative of which sensor (identified by its unique identifier) is in each group (this is referred to as group information) is determined in advance and stored, together with the predetermined weightings of each sensor in each group at each measurement time, in the storage medium 207 of the device 101. This allows the processor 207 to calculate the value of the parameter (e.g. temperature) for the group sensor of each group at each measurement time of the measurement cycle of that group, in the way as previously described.

In an embodiment, the group information and weightings are configured using a suitable user interface (e.g. keyboard or touch screen, not shown) of the device 101. For example, once the sensors 102 have been distributed across the environment to be monitored, a user controls the device 101 to broadcast a discovery signal detectable by all distributed sensors. Each sensor 102 then transmits a response signal, the response signal of each sensor comprising the unique identifier of that sensor and, optionally, location data (e.g. Global Navigation Satellite System (GNSS) data generated by a GNSS receiver of the sensor included as part of the sensor controller 202) indicative of the geographical location of that sensor. In the case that location data is not included in the response signal, then the user may manually enter location data indicative of the geographical location of each sensor. The unique identifier and location data of each sensor are then stored in a sensor location lookup table stored in the storage medium 207, for example. Alternatively, each sensor may transmit location data together with each instance of sensor data that it transmits. In this case, such a sensor location lookup table is not required. The location data of each sensor (if present) may be used by the user to help determine which sensors should be in each group and/or to help with the generation of information to be output for display on the display device 103. The information to be displayed may take the form of a computer generated image of the environment over which the sensors are distributed together with information (e.g. overlaid numerical values, different coloration, or the like) indicative of the calculated value of the one or more measured parameters at each location within the environment at which a sensor is present, for example.

The user then defines a group of sensors for each sensor by identifying each sensor which is in that group. For example, the user would identify the sensors $S_{n-2}$, $S_{n-1}$, $S_n$, $S_{n+1}$ and $S_{n+2}$ as being in the sensor group of sensor $S_n$ in FIGS. 3A to 3E. The user does this based on the unique identifier and location data of each sensor for which a response signal is received. Appropriate further sensor variables, such as the time during the measurement cycle at which each sensor in each group transmits sensor data and the weightings for each sensor in the group at each of those times, are then defined. In one example, a timing signal is transmitted to each sensor. The timing signal comprises, for example, the unique identifier of the sensor it is intended for and information indicative of the time during the measurement cycle (e.g. $t_1$, $t_2$, $t_3$, $t_4$ or $t_5$) at which that sensor should transmit sensor data. The time assigned to each sensor may be defined relative to the start of an active time period of that sensor, for example. Once the sensor measurement times have been defined, the setup is complete and the device 101 will begin to receive sensor data from each of the sensors at the time defined for that sensor. The value of the measured one or more parameters of each group sensor can then be calculated at each measurement time during the measurement cycle in the way as previously described.

In an alternative embodiment, each sensor 102 may be configured to transmit but not receive wireless signals. In this case, when each sensor 102 is placed at its intended location within the environment to be monitored, it is preconfigured with a measurement time at which to take a measurement and transmit sensor data to the device 101. Again, the measurement time (e.g. $t_1$, $t_2$, $t_3$, $t_4$ or $t_5$) of each sensor is defined relative to the start of an active time period of that sensor. Upon successful placement of the sensor, it starts periodically transmitting sensor data to the device 101 at the preconfigured measurement time. The device 101 thus uses the signals comprising the sensor data (with which the unique identifier and, optionally, location data of the sensor is also included) to allow the groups of sensors to be defined by the user. In an embodiment, the time of the measurement cycle at which each sensor transmits sensor data is known by the user in advance and used when defining the groups of sensors (e.g. so that each sensor in a given group takes a measurement and transmits sensor data at a different respective time). Alternatively, upon receiving the sensor data, the device 101 is able to determine the measurement time of each sensor based the time at which sensor data is received from that sensor relative to time at which sensor data is received from the other sensors. This information is then presented to the user to aid them in defining the groups of sensors.

It will be appreciated that the sensors in each group, the weightings and/or any other sensor variables (e.g. the measurement time of each sensor during the measurement cycle) may be determined automatically using a suitable computer algorithm rather than being determined manually by the user. Any suitable computer algorithm may be used. Such an algorithm is executed by the processor 205 of the data processing device 101, for example. In one example, a machine learning algorithm is used. The machine learning algorithm is trained by providing data from every sensor at every measurement time for a finite, initial, training time period. For example, during this training time period, each of $S_{n-2}$, $S_{n-1}$, $S_n$, $S_{n+1}$ and $S_{n+2}$ would provide a measurement at every one of times $t_1$, $t_2$, $t_3$, $t_4$ and $t_5$ (rather than only $S_n$ providing a measurement at $t_1$, only $S_{n+1}$ providing a measurement at time $t_2$, etc.) This allows a true, measured value of the parameter at every sensor location at every measurement time over the training time period to be known. The machine learning algorithm then performs an optimisation process to determine the sensor groupings, weightings and/or other sensor variables which produce the best estimates of the measured parameter values. For example, the machine learning algorithm may be a suitable genetic algorithm (various genetic algorithms are known in the art and are therefore not described here). Once the sensor groupings, weightings and/or other sensor variables have been optimised in this way, the sensors (e.g. in response to a trigger signal transmitted by the device 101) then revert back to the normal operation as previously described (in which only one sensor provides sensor data at each measurement time during the measurement cycle and in which the parameter values of the other sensors at that measurement time are estimated). Because of the optimisation, however, the accuracy of the estimated parameter values at each sensor location is improved.

In general, it will thus be appreciated that, in order for the device 101 to calculate the value of the one or more parameters at the location of the group sensor at each measurement time of the measurement cycle of that group, the sensor which transmits each instance of sensor data must be identifiable (e.g. based on a unique identifier of the sensor provided with the sensor data or, more generally, a characteristic of the wireless signal comprising the sensor data from which the transmitting sensor is identifiable) and the sensors in each group (i.e. the group information) and the weightings of the sensors in each group at each measurement time of the measurement cycle of that group must be known. The device 101 must also know which measurement time of the measurement cycle it currently is (e.g. whether it is time $t_1$, $t_2$, $t_3$, $t_4$ or $t_5$) in order to select the correct weightings (e.g. according to a table such as Table 1). The device 101 may know the measurement time based on a predetermined measurement time associated with each uniquely defined sensor (e.g. so that, when sensor data is received from sensor $S_n$, the device 101 knows that it must be measurement time $t_1$ of the measurement cycle, when sensor data is received from sensor $S_{n+1}$, the device 101 knows that it must be the measurement time $t_2$ of the measurement cycle, and so on). Alternatively, the device 101 may establish timing synchronisation with each of the sensors 102 (e.g. so that both the devices 101 and sensors 102 determine it to be time $t_1$, $t_2$, $t_3$, etc. at the same time). This is achieved using any suitable technique for achieving timing synchronisation in a wireless communications system.

In embodiments, associations between instances of stored information (e.g. the unique identifier of the group sensor and the unique identifiers of the one or more other sensors in each group, the weightings of each sensor in each group at each measurement time of the measurement cycle of that group, the location data of each sensor (if present) and the time at which each sensor makes a measurement (if present)) are implemented by way of lookup tables, databases or the like stored in the storage medium 207. When a portion of this information is different for different time periods (e.g. if it is different during the day and night, as exemplified above), then separate sets of this information may be stored for each of these time periods. The appropriate set of information is then used according to the current time.

In an embodiment, in order to reduce the amount of sensor data which each sensor must transmit at its associated measurement time of the measurement cycle, if the measured value of the parameter of a particular sensor has not changed since the last time a measurement was taken (or has not changed by more than a predetermined threshold), the sensor transmits, as the sensor data, data indicative that there has been no change in the measured parameter value rather than retransmitting the same value of the parameter. The data indicative that there has been no change (e.g. a flag such as a single bit in a predetermined field of a transmitted data packet) is less than the amount of data which must be transmitted to indicate a particular parameter value. Transmitting less data in this way reduces the network overhead required to transmit the sensor data and reduces the power consumption of the transmitting sensor.

In the above embodiments, the parameter measured by the sensors 102 distributed along the road 104 is temperature. Other parameters may be measured instead of or in addition to the temperature. For example, the humidity, an amount of an air pollutant (such as $CO_2$, $NO_x$ or particulate pollutants) and/or a vehicle count may be measured. The sensor data transmitted to the device 101 comprises data indicative of the measured value of each of the parameters monitored by the sensor.

The present technique is not limited to road sensors, but may be used with sensors distributed across any conceivable environment in which it is desirable for the sensor battery life to be improved. Some further example environments are discussed with reference to FIGS. 4 to 6.

Figure 4:
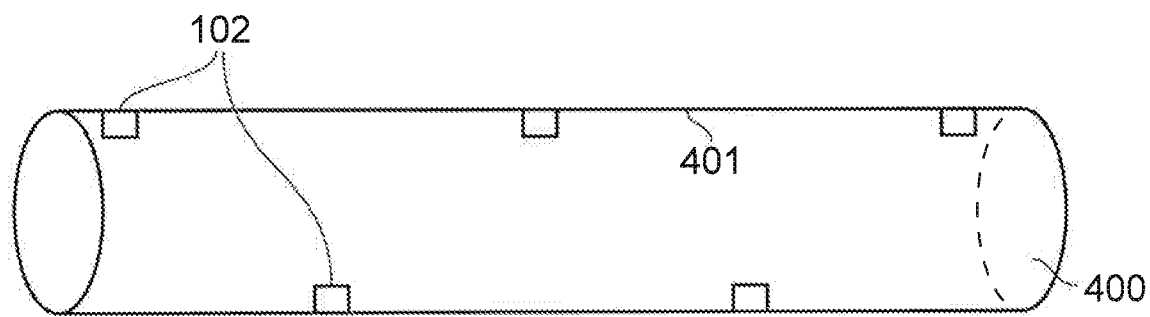
FIG. 4 schematically shows a fluid transport conduit along which sensors are distributed, according to an embodiment.

FIG. 4 shows a fluid transport conduit 400 (e.g. a gas or oil pipeline) along which sensors 102 are distributed. For example, the sensors may be attached to or embedded within the inner surface 401 of the conduit 400 so as to measure one or more parameters associated with fluid flowing through the conduit. The one or more parameters measured by the sensors include, for example, temperature, vibration, pressure, fluid flow rate, a parameter indicative of degradation of the inner surface of the conduit (e.g. by corrosion, especially at inflection points, elbows, valves or inlets of the conduit) and/or a parameter indicative of a build up of a substance on the inner surface of the conduit (e.g. fat build up on the inner surface of a sewage pipe). The measured parameters are chosen to allow fluid flow through the conduit and/or the structural integrity of the conduit to be monitored and any problems (e.g. blockages, leaks, degradation or the like) to be detected. The distribution of the sensors is similar to that for the road 104 in that the sensors are distributed along the length of the conduit in the direction of fluid flow (for the road 104, the sensors are distributed along the length of the road in the direction of traffic flow). Replacing the batteries of the sensors distributed along the length of the conduit requires either taking apart the conduit (which is time consuming and requires the flow of fluid to be temporarily suspended) and/or a person to enter the conduit (which is time consuming and hazardous). The lower sensor power consumption enabled by the present technique reduces how often batteries need to be replaced, thereby alleviating these problems.

Figure 5:
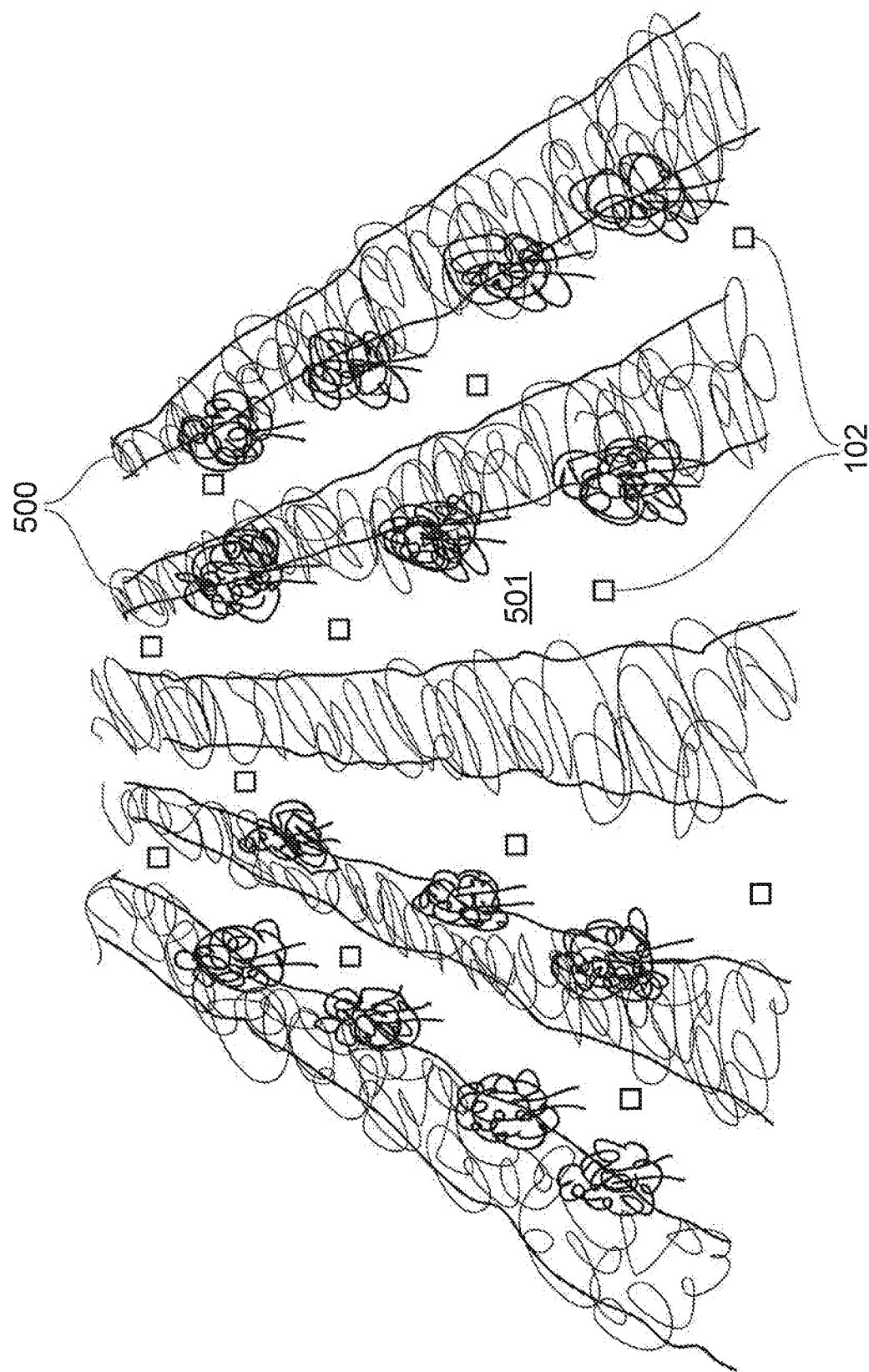
FIG. 5 schematically shows an agricultural region over which sensors are distributed, according to an embodiment.

FIG. 5 shows an agricultural region (in this example, a vineyard) over which sensors 102 are distributed. The sensors are embedded in the soil 501 in which crops 500 (in this case, grapevines) are grown so as to measure one or more parameters associated with the soil. The one or more parameters measured by the sensors include, for example, temperature, humidity (which can be used to determine soil permeability, for example, based on the humidity measured by sensors at different depths within the soil), soil acidity/alkalinity, nutrient (e.g. nitrate) concentration or toxin concentration. It will be appreciated that the agricultural region may make use of a hydroponic system (over which at least a portion of the sensors are distributed) instead of or in addition to the use of soil. The measured parameters are chosen to allow the growing conditions of the crops to be monitored so as to allow more effective cultivation of the crops. For example, if humidity is too low or too high, then it can be concluded that more or less water should be provided to the crops. If the temperature is too low or too high, then it can be concluded that the crops should be protected from the cold or should be shaded from the sun. If the soil acidity/alkalinity is too low or too high, then appropriate agricultural products can be added to the soil to correct the acidity/alkalinity. The distribution of the sensors is different to that of the road 104 or conduit 400 in that the sensors are distributed over a wide area of agricultural land rather than along a length in the direction of traffic or fluid flow (that is, the sensors of FIG. 5 are distributed over an approximate 2D area rather than along an approximate 1D length as in FIGS. 1 and 4). However, the present technique applies in the same way. In this case, the groups of sensors are determined by determining all sensors within a predetermined distance of a group sensor to be within that group, for example. Replacing the batteries of the sensors distributed over the agricultural region requires a person to travel over the entire agricultural region (which is time consuming and may result in plants becoming disturbed). The lower sensor power consumption enabled by the present technique reduces how often batteries need to be replaced, thereby alleviating these problems.

In a variation of FIG. 5, the agricultural region may comprise a volume of water (e.g. in a tank or in a delimited area of open water) containing aquatic animals. This occurs for a fish farm, for example. In this case, the one or more parameters measured by the sensors include, for example, temperature, oxygen concentration, algae concentration (e.g. based on $CO_2$ concentration, with higher levels of algae being associated with higher levels of dissolved $CO_2$), toxin concentration and sediment build up.

Figure 6:
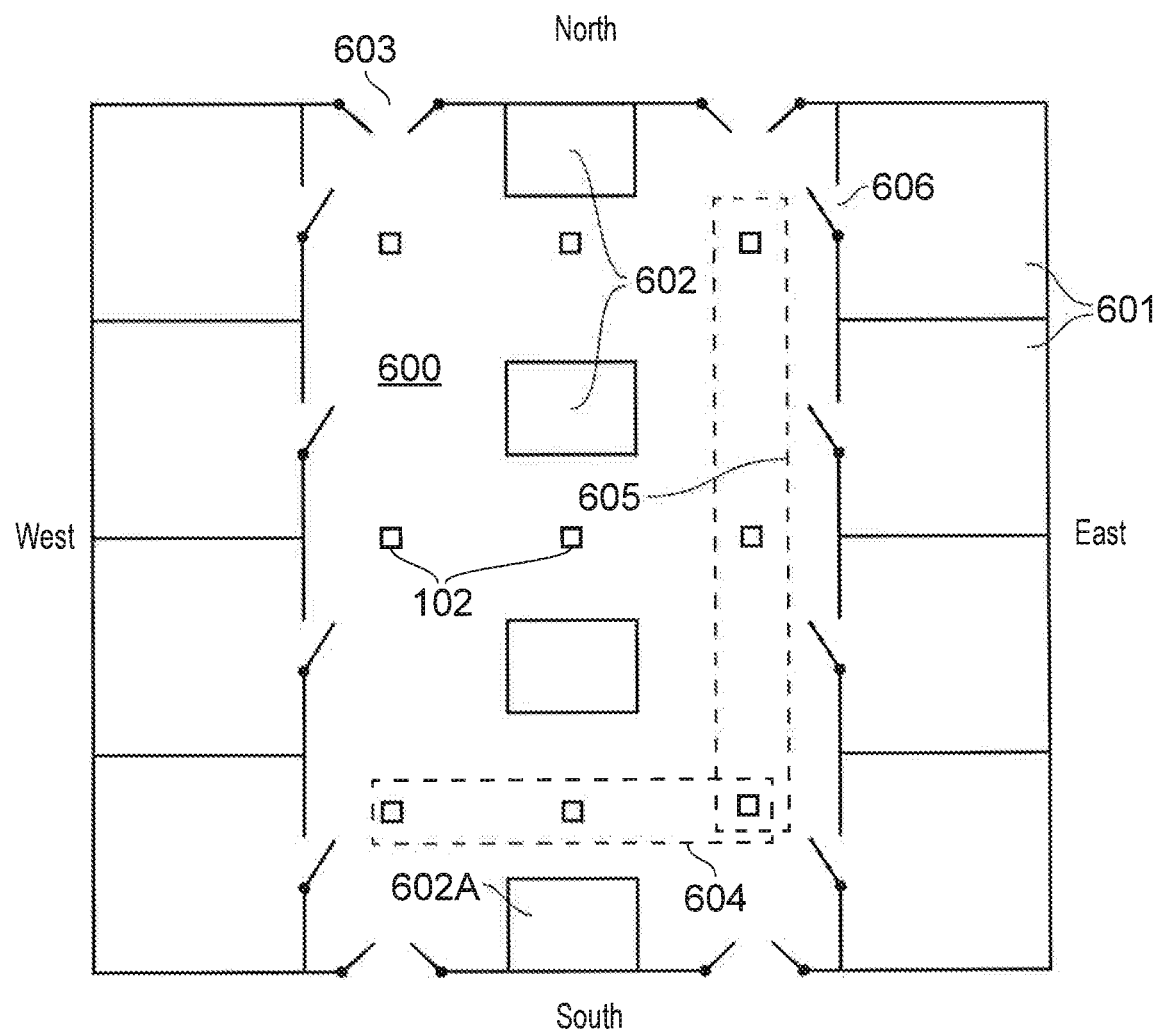
FIG. 6 schematically shows a pedestrianised region over which sensors are distributed, according to an embodiment.

FIG. 6 shows a pedestrianised region (in this example, a shopping mall comprising various shops 601 with their own entrances 606, decorative features 602 (e.g. plants, fountains or the like) and entrance/exit doors 603) over which sensors 102 are distributed. The sensors are embedded in the floor 600 so as to measure one or more parameters associated with the pedestrianised region. The one or more parameters measured by the sensors include, for example, temperature, humidity, an amount of an air pollutant (such as $CO_2$, $NO_x$ or particulate pollutants) and/or a pedestrian count. The measured parameters are chosen to allow conditions of the pedestrianised area to be monitored so as to ensure that it is comfortable and safe for pedestrians. For example, if the temperature or humidity is too low or too high, then the air ventilation and cooling/heating system of the shopping mall can be adjusted accordingly. If an amount of a pollutant is too high, then the source of that pollutant can be investigated (e.g. there may be a road with heavy, polluting traffic nearby) and appropriate action taken (e.g. installing air filters in the air ventilation system of the shopping mall and/or asking the local authority to take action on pollution generated by nearby traffic). The pedestrian count at each of the sensors can be used to determine the distribution of pedestrians over the pedestrianised area at various times, thereby enabling the layout of the pedestrianised area to be adjusted so as to improve the flow of pedestrians. This improves the experience of pedestrians and also facilitates pedestrian safety in the case of an emergency evacuation, for example.

The distribution of the sensors is similar to that of the agricultural region of FIG. 5 in that the sensors are distributed over a wide area of floor space rather than along a length in the direction of traffic or fluid flow. In this case, the groups of sensors may be determined differently depending on the one or more parameters which are measured.

For example, for environmental parameters such as temperature, humidity and pollution, the groups may be determined by determining all sensors within a predetermined distance of a group sensor to be within that group.

On the other hand, for parameters related to the pedestrians themselves such as the pedestrian count, the groups may be determined in a bespoke manner depending on the layout of the pedestrianised area. In FIG. 5, two example sensor groups 604 and 605 are shown. Each sensor in each group periodically measures and reports a pedestrian count (e.g. the number of pedestrians detected by that sensor since it last took a measurement). All sensors in the group 604 are located close to the south side of the shopping mall. The sensor data generated by each of these sensors can therefore be combined to give a reliable estimate of the pedestrian count at the south side of the shopping mall. Similarly, all sensors in the group 605 are located close to the east side of the shopping mall. The sensor data generated by each of these sensors can therefore be combined to give a reliable estimate of the pedestrian count at the east side of the shopping mall. Groups of sensors located at other predetermined locations within the shopping mall (e.g. the north side and west side or outside certain shops) can be selected in a similar way. This allows the pedestrian distribution throughout the shopping mall to be monitored and appropriate improvements to be made. For example, if it is seen that the pedestrian count at the south side of the shopping mall is consistently higher than that at the north side of the shopping mall, then it may be concluded that the decorative feature 602A at the south side should be removed in order to provide more space for pedestrians.

Replacing the batteries of the sensors distributed over the pedestrianised region requires a person to travel over the entire agricultural region (which is time consuming and may require certain parts of the pedestrianised area to be temporarily made off limits to pedestrians whilst the sensors batteries are removed and replaced). The lower sensor power consumption enabled by the present technique reduces how often batteries need to be replaced, thereby alleviating these problems.

In some embodiments, sensors which measure different parameters in the same environment (e.g. sensors which measure temperature and sensors which measure a pedestrian count in a shopping mall or sensors which measure $CO_2$ pollution along a road and sensors which measure particulate pollution along a road) may be grouped differently and make and report measurements at different times and/or at different intervals. This allows an appropriate balance to be achieved between reduced sensor power consumption (the measurement of different parameters may required different amounts of power) and the reliability of estimated measurements (different parameters may have a different spatial and/or temporal variation).

Figure 7:
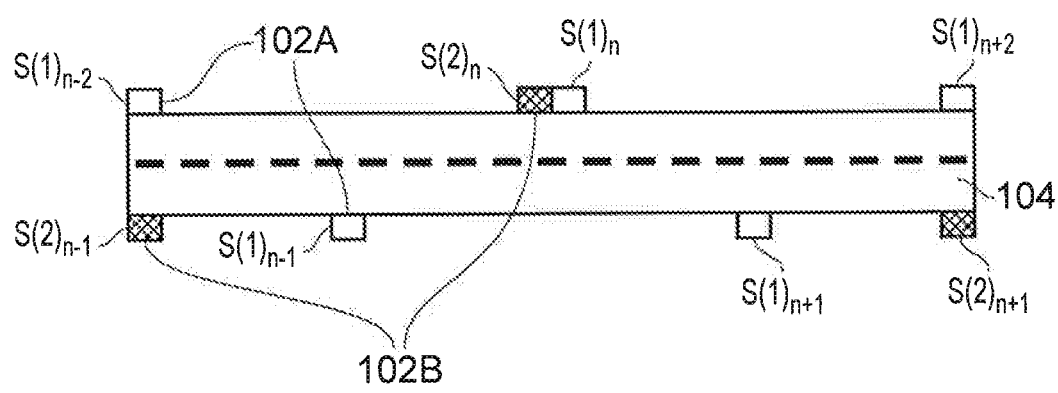
FIG. 7 schematically shows a system in which there is a first set of sensors which measure a first parameter and a second set of sensors which measure a second, different, parameter, according to an embodiment.

An example of this is shown in FIG. 7, in which there is a first set of sensors 102A which measure a first parameter and a second set of sensors 102B which measure a second, different, parameter. The sensors 102A and 10B are located along the same road 104. Each sensor 102A and 102B may be a physically separate sensor (each with its own communication interface 200, sensor hardware 201, controller 202 and battery 203). Alternatively, at least some of the sensors 102A may each be combined with a sensor 10B so as to form a single sensor (with a single shared communication interface 200, controller 202 and battery 203 connected to two different types of sensor hardware 201, one type for measuring the first parameter and one type for measuring the second parameter). In the latter case, the second set of sensors is part of the first set of sensors. The first set of sensors 102A comprises a different number of sensors than the second set of sensors 102B and the groups of sensors 102A each comprise a different number of sensors than the groups of sensors 102B. In this case, there are more sensors 102A than there are sensors 101B and the number of sensors 102A in each group is greater than the number of sensors 102B in each group. This is illustrated in FIG. 7, in which the group of sensor $S(1)_n$ (which belongs to the first set of sensors 102A) comprises sensors $S(1)_{n-2}$, $S(1)_{n-1}$, $S(1)_n$, $S(1)_{n+1}$ and $S(1)_{n+2}$ (a total of 5 sensors) whereas the group of sensor $S(2)_n$ (which belongs to the second set of sensors 102B) comprises sensors $S(2)_{n-1}$, $S(2)_n$, $S(2)_{n+1}$ (a total of 3 sensors). The measurement cycle of each group of sensors 102A thus comprises a larger number of measurement times than the measurement cycle of each group of sensors 102B (since there are more sensors in each group to give a measurement). The length of the measurement cycle of each group of sensors 102A may be different to that of each group of sensors 102B. For example, the measurement cycle of each group of sensors 102B may be longer than that of each group of sensors 102A, thereby further reducing the rate at which measurements are made in the second group. In the example of FIG. 7, the first parameter may be a parameter with a greater spatial and/or temporal variation and/or a parameter for which each measurement and transmission requires a lower amount of power and the second parameter may be a parameter with a lower spatial and/or temporal variation and/or a parameter which requires a higher amount of power to measure. Having the first and second sets of sensors to respectively measure each of these parameters (with appropriately different timings and groupings) thus provides a balance between sensor power consumption and parameter calculation accuracy which is tailored to the nature of the parameter which is measured.

In embodiments, the sensor hardware 201 may be any suitable sensor hardware known in the art to measure the parameter concerned. When the measured parameter is temperature, the sensor hardware 201 may comprise a thermistor or the like, for example. When the measured parameter is humidity/moisture level, the sensor hardware 201 may comprise a capacitive hygrometer or the like, for example. When the measured parameter is an amount of an air pollutant, the sensor hardware 201 may comprise a nondispersive infrared (NDIR) sensor or the like (e.g. to measure $CO_2$ or $NO_x$ levels) or a tapered element oscillating microbalance (TEOM) or the like (e.g. to measure the amount of particulate matter in the air), for example. When the measured parameter is vibration or pressure, the sensor hardware 201 may comprise a piezoelectric sensor or the like, for example. Measured pressure may also be used to determine fluid flow rate (e.g. based on a predefined relationship between flow rate and pressure), a depth of water or snow (for example, for a sensor at the bottom of a puddle of water, the pressure will be higher the deeper the puddle) or a vehicle or pedestrian count (e.g. based the measured pressure exceeding a predetermined threshold corresponding to the weight of a vehicle or pedestrian). When the measured parameter is acidity/alkalinity, the sensor hardware 201 may comprise a pH meter or the like, for example. When the measured parameter is an amount of oil, the sensor hardware 201 comprises suitable oil detection hardware such as a nephelometer. When the measured parameter is an amount of corrosion, the sensor hardware 201 comprises suitable ultrasonic, radiographic, guided wave or electromagnetic corrosion detection hardware, for example. When the measured parameter is an amount of substance build up (e.g. build up of a substance adhered to an inner surface of a conduit or of sediment in a volume of water), the sensor hardware 201 comprises suitable build up detection hardware (e.g. hardware which uses laser measurements to detect a change in width of a conduit due to build up or a change in depth of a volume of water due to build up or which uses a change in electrical conductivity due to the build up a foreign substance on the inner surface of a conduit or on the floor of a volume of water), for example. When the measured parameter is a chemical substance such as a nutrient (e.g. nitrate), a toxin, oxygen or $CO_2$, the sensor hardware 201 comprises suitable chemical detection hardware for detecting characteristic chemicals of the substance concerned, for example. Various electronic detection methods for detecting the presence of particular chemicals in air or water are known in the art and are therefore not discussed in detail here. It will be appreciated that these types of sensor hardware are merely examples and that sensor hardware appropriate to the parameter to be measured and the environment within which the parameter is to be measured may be selected on a case by case basis by one skilled in the art.

Figure 8:
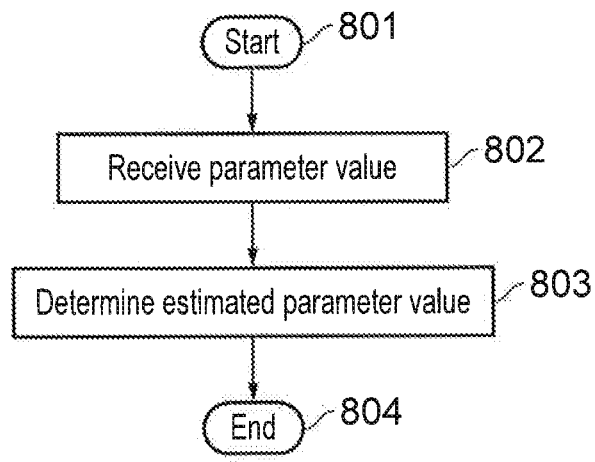
FIG. 8 shows a method carried out by a data processing device, according to an embodiment.

FIG. 8 shows a method carried out by the device 101, according to an embodiment. The method starts at step 801. At step 802, a signal is received from each of a plurality of sensors (e.g. sensors $S_{n-2}$, $S_{n-1}$, $S_n$, $S_{n+1}$ and $S_{n+2}$) each located at a respective location. Each signal is indicative of a respective value of a parameter measured by that sensor at a respective one of a plurality of successive times (e.g. times $t_1$, $t_2$, $t_3$, $t_4$ and $t_5$). At step 803, based on the value of the parameter measured by one or more first sensors of the plurality of sensors at a respective one or more of the plurality of successive times, a value of the parameter at the location of a second sensor of the plurality of sensors at one of the one or more of the plurality of successive times is determined (for example, the parameter value measured by one or more of the sensors $S_{n-2}$, $S_{n-1}$, $S_n$, $S_{n+1}$ and $S_{n+2}$ at times $t_1$, $t_2$, $t_3$, $t_4$ and $t_5$, respectively, is used to determine the parameter value at the location of $S_n$ at one or more of the times $t_1$, $t_2$, $t_3$, $t_4$ and $t_5$ using a suitable weighted sum, as previously described). The method ends at step 804.

Figure 9:
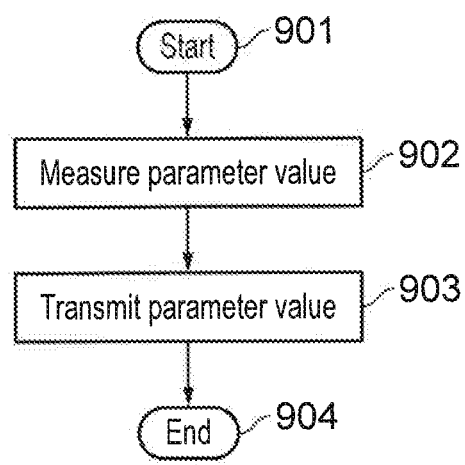
FIG. 9 shows a method carried out by a sensor, according to an embodiment.

FIG. 9 shows a method carried out by a sensor 102, according to an embodiment. The method starts at step 901. At step 902, the sensor periodically measures a value of a parameter of its environment (e.g. temperature, humidity or the like, as previously described). At step 903, the sensor 102 transmits, to the device 101, signals each indicative of a respective one of the measured parameter values. The signals are periodically transmitted over a low-power wide-area network, LPWAN, during a subset of periodic duty cycle-constrained active time periods of the LPWAN. The method ends at step 904.

Embodiments of the present disclosure are defined by the following numbered clauses:

1. A data processing method comprising:
   receiving, from each of a plurality of sensors each located at a respective location, a signal indicative of a respective value of a parameter measured by that sensor at a respective one of a plurality of successive times; and
   determining, based on the value of the parameter measured by one or more first sensors of the plurality of sensors at a respective one or more of the plurality of successive times, a value of the parameter at the location of a second sensor of the plurality of sensors at one of the one or more of the plurality of successive times.

2. A data processing method according to clause 1, wherein the signal received from each sensor is received over a low-power wide-area network, LPWAN.

3. A data processing method according to clause 1 or 2, wherein the value of the parameter at the location of the second sensor is determined based on a weighted combination of the values of the parameter measured by the one or more first sensors, the weighting of the value of the parameter measured by each of the one or more first sensors being determined based on one or more of a time elapsed since the value of the parameter was measured by that first sensor and a spatial separation between the first sensor and the second sensor.

4. A data processing method according to clause 3, wherein:
   a variation in space and/or time of the parameter varies with different time periods; and
   weightings of the values of the parameter measured by the one or more first sensors vary accordingly with the different time periods.

5. A data processing method according to any preceding clause, wherein:
   a variation in space and/or time of the parameter varies with different time periods; and
   a number of first sensors used to determine the value of the parameter at the location of the second sensor varies accordingly with the different time periods.

6. A data processing method according to any preceding clause, wherein:
   a variation in space and/or time of the parameter varies with different time periods; and
   an interval between each of the plurality of successive times varies accordingly with the different time periods.

7. A data processing method according to any preceding clause, comprising:
   for each sensor, receiving further signals from that sensor indicative of respective further values of the parameter periodically measured by that sensor, the further measurements of the sensors being interleaved with each other in time at respective ones of a plurality of further successive times; wherein, for each sensor:
   if the latest measured value of the parameter is different to the previous measured value of the parameter, the further signal indicative of the latest measured value of the parameter comprises the latest measured value of the parameter, and
   if the latest measured value of the parameter is within a predetermined threshold of the previous measured value of the parameter, the further signal indicative of the latest measured value of the parameter comprises an indicator indicating that the latest measured value of the parameter is the same as the previous measured value of the parameter.

8. A data processing method according to any preceding clause, wherein:
   the plurality of sensors comprises a first set of sensors each configured to measure a value of a first parameter and a second set of sensors each configured to measure a value of a second parameter; and
   an interval between each of the plurality of successive times at which a value of the first parameter is measured by a respective one of the first set of sensors is different to an interval between each of the plurality of successive times at which a value of the second parameter is measured by a respective one of the second set of sensors, and/or
   the spatial separation between the sensors of the first set of sensors is different to the spatial separation between the sensors of the second set of sensors.

9. A data processing method according to any preceding clause, wherein the plurality of sensors are distributed along a road and the parameter measured each sensor is one of temperature, humidity, an amount of an air pollutant, a vehicle count, a depth of settled precipitation and the presence of an oil-based substance.

10. A data processing method according to any one of clauses 1 to 8, wherein the plurality of sensors are distributed along a fluid transport conduit and the parameter measured by each sensor is one of temperature, vibration, pressure, fluid flow rate, conduit degradation and substance build up.

11. A data processing method according to any one of clauses 1 to 8, wherein the plurality of sensors are distributed over an agricultural region and the parameter measured by each sensor is one of temperature, humidity, an amount of acidity or alkalinity, an amount of a nutrient and an amount of a toxin.

12. A data processing method according to any one of clauses 1 to 8, wherein the plurality of sensors are distributed over a volume of water containing aquatic animals and the parameter measured by each sensor is one of temperature, oxygen concentration, algae concentration, toxin concentration and sediment build up.

13. A data processing method according to any one of clauses 1 to 8, wherein the plurality of sensors are distributed over a pedestrianised region and the parameter measured by each sensor is one of temperature, humidity, an amount of an air pollutant and a pedestrian count.

14. A sensing method comprising:
   periodically measuring a value of a parameter of an environment;
   transmitting, to a data processing apparatus, signals each indicative of a respective one of the measured parameter values, the signals being periodically transmitted over a low-power wide-area network, LPWAN, during a subset of periodic duty cycle-constrained active time periods of the LPWAN.

15. A non-transitory storage medium comprising computer readable instructions for controlling a computer to perform a method according to any preceding clause.

16. A data processing apparatus comprising:
   receiver circuitry configured to receive, from each of a plurality of sensors each located at a respective location, a signal indicative of a respective value of a parameter measured by that sensor at a respective one of a plurality of successive times; and
   processor circuitry configured to determine, based on the value of the parameter measured by one or more first sensors of the plurality of sensors at a respective one or more of the plurality of successive times, a value of the parameter at the location of a second sensor of the plurality of sensors at one of the one or more of the plurality of successive times.

17. A data processing apparatus according to clause 16, comprising output circuitry configured to output, to an audio and/or visual device, information determined according to the determined value of the parameter at the location of the second sensor.

18. A system comprising:
   a data processing apparatus according to clause 16; and
   a plurality of sensors each located at a respective location and configured to measure a respective value of a parameter at a respective one of a plurality of successive times and transmit a signal indicative of the measured value of the parameter to the data processing apparatus.

19. A sensor apparatus comprising:
sensor circuitry configured to periodically measure a value of a parameter of the environment of the sensor apparatus;
communication circuitry configured to transmit, to a data processing apparatus, signals each indicative of a respective one of the measured parameter values, the signals being periodically transmitted over a low-power wide-area network, LPWAN, during a subset of periodic duty cycle-constrained active time periods of the LPWAN.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:
1. A data processing method comprising:
receiving, from each of a plurality of sensors each located at a respective location, a signal indicative of a respective value of a parameter measured by that sensor at a respective one of a plurality of successive times in a common measurement cycle set to each of the plurality of sensors such that only one signal indicative of the respective value of the parameter is received from the plurality of sensors corresponding to each of the plurality of successive times in the common measurement cycle, each of the plurality of sensors including a battery used to transmit the respective signals; and
determining, by circuitry, based on the value of the parameter measured by one or more first sensors of the plurality of sensors at a respective one or more of the plurality of successive times, a value of the parameter at the location of a second sensor of the plurality of sensors at one of the one or more of the plurality of successive times,
wherein the signal received from each sensor is received over a low-power wide-area network, LPWAN.

2. The data processing method according to claim 1, wherein the value of the parameter at the location of the second sensor is determined based on a weighted combination of the values of the parameter measured by the one or more first sensors, the weighting of the value of the parameter measured by each of the one or more first sensors being determined based on one or more of a time elapsed since the value of the parameter was measured by that first sensor and a spatial separation between the first sensor and the second sensor.

3. The data processing method according to claim 2, wherein:
a variation in space and/or time of the parameter varies with different time periods; and
weightings of the values of the parameter measured by the one or more first sensors vary accordingly with the different time periods.

4. The data processing method according to claim 1, wherein:
a variation in space and/or time of the parameter varies with different time periods; and
a number of first sensors used to determine the value of the parameter at the location of the second sensor varies accordingly with the different time periods.

5. The data processing method according to claim 1, wherein:
a variation in space and/or time of the parameter varies with different time periods; and
an interval between each of the plurality of successive times varies accordingly with the different time periods.

6. The data processing method according to claim 1, comprising:
for each sensor, receiving further signals from that sensor indicative of respective further values of the parameter periodically measured by that sensor, the further measurements of the sensors being interleaved with each other in time at respective ones of a plurality of further successive times; wherein, for each sensor:
if the latest measured value of the parameter is different to a previous measured value of the parameter, the further signal indicative of the latest measured value of the parameter comprises the latest measured value of the parameter, and
if the latest measured value of the parameter is within a predetermined threshold of the previous measured value of the parameter, the further signal indicative of the latest measured value of the parameter comprises an indicator indicating that the latest measured value of the parameter is the same as the previous measured value of the parameter.

7. The data processing method according to claim 1, wherein:
the plurality of sensors comprises a first set of sensors each configured to measure a value of a first parameter and a second set of sensors each configured to measure a value of a second parameter; and
an interval between each of the plurality of successive times at which a value of the first parameter is measured by a respective one of the first set of sensors is different to an interval between each of the plurality of successive times at which a value of the second parameter is measured by a respective one of the second set of sensors, and/or a spatial separation between the sensors of the first set of sensors is different to the spatial separation between the sensors of the second set of sensors.

8. The data processing method according to claim 1, wherein the plurality of sensors are distributed along a road and the parameter measured each sensor is one of temperature, humidity, an amount of an air pollutant, a vehicle count, a depth of settled precipitation and a presence of an oil-based substance.

9. The data processing method according to claim 1, wherein the plurality of sensors are distributed along a fluid transport conduit and the parameter measured by each sensor is one of temperature, vibration, pressure, fluid flow rate, conduit degradation and substance build up.

10. The data processing method according to claim 1, wherein the plurality of sensors are distributed over an agricultural region and the parameter measured by each sensor is one of temperature, humidity, an amount of acidity or alkalinity, an amount of a nutrient and an amount of a toxin.

11. The data processing method according to claim 1, wherein the plurality of sensors are distributed over a volume of water containing aquatic animals and the parameter measured by each sensor is one of temperature, oxygen concentration, algae concentration, toxin concentration and sediment build up.

12. The data processing method according to claim 1, wherein the plurality of sensors are distributed over a pedestrianized region and the parameter measured by each sensor is one of temperature, humidity, an amount of an air pollutant and a pedestrian count.

13. A non-transitory storage medium comprising computer readable instructions for controlling a computer to perform a method according to claim 1.

14. The data processing method according to claim 1, wherein the value of the parameter at the location of the second sensor is determined based on a weighted combination of the values of the parameter measured by the one or more first sensors, the weighting of the value of the parameter measured by each of the one or more first sensors being determined based on both of a time elapsed since the value of the parameter was measured by that first sensor and a spatial separation between the first sensor and the second sensor.

15. A data processing apparatus comprising:
receiver circuitry configured to receive, from each of a plurality of sensors each located at a respective location, a signal indicative of a respective value of a parameter measured by that sensor at a respective one of a plurality of successive times in a common measurement cycle set to each of the plurality of sensors such that only one signal indicative of the respective value of the parameter is received from the plurality of sensors corresponding to each of the plurality of successive times in the common measurement cycle in the common measurement cycle, each of the plurality of sensors including a battery used to transmit the respective signals; and processor circuitry configured to determine, based on the value of the parameter measured by one or more first sensors of the plurality of sensors at a respective one or more of the plurality of successive times, a value of the parameter at the location of a second sensor of the plurality of sensors at one of the one or more of the plurality of successive times, wherein the signal received from each sensor is received over a low-power wide-area network, LPWAN.

16. The data processing apparatus according to claim 15, comprising output circuitry configured to output, to an audio and/or visual device, information determined according to the determined value of the parameter at the location of the second sensor.

17. A system comprising:
the data processing apparatus according to claim 15; and
the plurality of sensors each located at the respective location and configured to measure the respective value of the parameter at the respective one of the plurality of successive times and transmit the signal indicative of the measured value of the parameter to the data processing apparatus.

18. A sensor apparatus comprising:
a battery;
sensor circuitry configured to, using the battery, periodically measure a value of a parameter of an environment of the sensor apparatus at one of a plurality of successive times in a common measurement cycle set to each of a plurality of sensor apparatuses including the sensor apparatus such that only one value of the parameter is measured by the plurality of sensors at each of the plurality of successive times in the common measurement cycle;
communication circuitry configured to transmit, to a data processing apparatus, signals each indicative of a respective one of the measured parameter values, the signals being periodically transmitted over a low-power wide-area network, LPWAN, during a subset of periodic duty cycle-constrained active time periods of the LPWAN.

* * * * *